United States Patent
Jeffries

(10) Patent No.: US 6,932,694 B2
(45) Date of Patent: Aug. 23, 2005

(54) VENT

(75) Inventor: Mark Jeffries, Cumming, GA (US)

(73) Assignee: Austin Hardware and Supply, Inc., Lee's Summit, MO (US)

( * ) Notice: Subject to any disclaimer, the term of this patent is extended or adjusted under 35 U.S.C. 154(b) by 0 days.

(21) Appl. No.: 10/653,380

(22) Filed: Sep. 2, 2003

(65) Prior Publication Data

US 2005/0059337 A1 Mar. 17, 2005

(51) Int. Cl.$^7$ ................................................ B60H 1/00
(52) U.S. Cl. ..................... 454/145; 454/128; 454/136
(58) Field of Search ............................ 454/128, 136, 454/33, 149, 145, 143

(56) References Cited

U.S. PATENT DOCUMENTS

| | | | | | |
|---|---|---|---|---|---|
| 3,046,865 A | * | 7/1962 | Kelly | ........................ | 454/145 |
| 3,375,772 A | * | 4/1968 | Kelly et al. | ................. | 454/143 |
| 3,587,443 A | * | 6/1971 | Rapport | ..................... | 454/136 |
| 3,760,707 A | * | 9/1973 | Kelly | ........................ | 454/145 |
| 3,839,950 A | * | 10/1974 | Kelly et al. | ................. | 454/145 |
| 4,038,911 A | * | 8/1977 | Hart | ............................ | 454/94 |
| 4,452,129 A | * | 6/1984 | Kelley et al. | ............... | 454/145 |
| 4,519,645 A | * | 5/1985 | Kelly et al. | ................. | 296/224 |
| 4,522,115 A | * | 6/1985 | Kelly et al. | ................... | 454/94 |
| 4,690,040 A | * | 9/1987 | Barnett | ...................... | 454/136 |
| 5,309,972 A | * | 5/1994 | Thomas | ....................... | 160/90 |
| 5,766,068 A | * | 6/1998 | Kelly | ........................ | 454/145 |
| 5,797,791 A | * | 8/1998 | Humphrey et al. | ......... | 454/134 |
| 6,106,385 A | * | 8/2000 | Humphrey et al. | ......... | 454/134 |
| 6,541,435 B2 | * | 4/2003 | Gatzke | ....................... | 510/185 |

* cited by examiner

Primary Examiner—Derek S. Boles
(74) Attorney, Agent, or Firm—Polsinelli Shalton Welte Suelthaus PC

(57) ABSTRACT

A ventilation apparatus or vent includes a handle, that is balanced for receiving forces, such that when force is applied anywhere on the handle, it is distributed such that a locking engagement will be broken. The handle can be moved easily, so as to open or close the apparatus, with minimal force from a user.

43 Claims, 5 Drawing Sheets

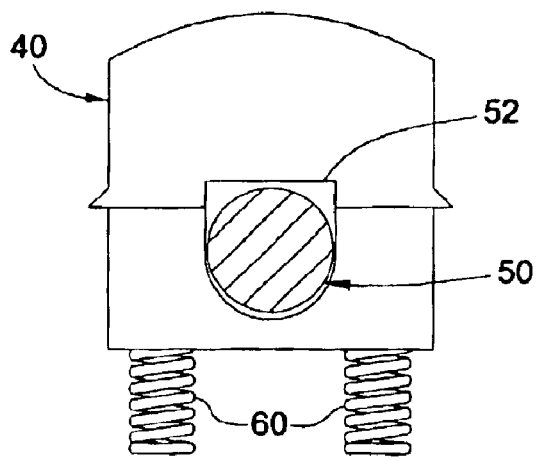
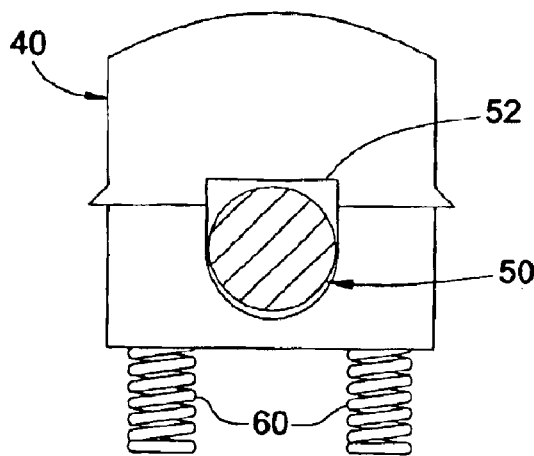
Fig. 5A.  Fig. 5B.
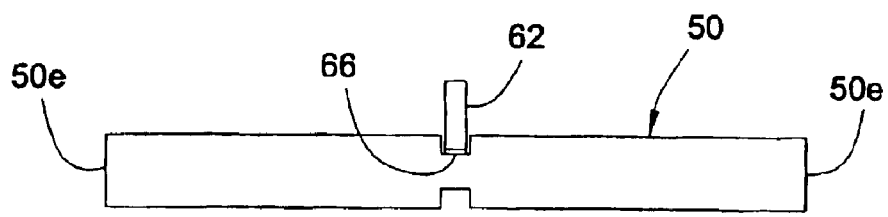
Fig. 6.

VENT

TECHNICAL FIELD

The present invention relates to ventilators for ventilating enclosed air spaces. In particular, the invention is directed to vents that can be easily opened by a single user.

BACKGROUND

Ventilators or vents are commonly used in the trucking industry, to ventilate and provide light to enclosed cab or vehicle spaces. These ventilators are typically mounted on the ceiling or roofs of the vehicle cab or space. These ventilators have excellent closing and sealing properties, as their closure must be such that elements from the ambient environment, such as water, cold air, dust, do not enter the vehicle through these ventilators when they are closed.

Since these ventilators are typically mounted in the ceilings or roofs of the vehicles, they are somewhat difficult to access. Accordingly, components used to open and close these ventilators are at heights that are typically difficult to reach and control for long time periods, such that opening and closing functions are awkward and difficult to perform. Also, these moving components are positioned at points to be unbalanced, requiring substantial strength and balance to move.

SUMMARY

The present invention is directed to a ventilator, vent or vent apparatus, having components that distribute forces from a user, applied anywhere to the requisite components, such that minimal strength of a user is required to open or close the ventilator. The requisite components include a handle, that is balanced for receiving forces, such that when force is applied anywhere on the handle, it is distributed such that a locking engagement will be broken and the handle can be moved easily so as to open or close the ventilator, with minimal force from a user.

An embodiment of the invention is directed to a vent apparatus. This apparatus includes a frame, typically having an opening therein, and a cover movable with respect to the frame between closed and open positions. There is at least one support member, typically two, in communication with the cover. There is also a handle portion in communication with the at least one support member, this handle portion configured for moving between relaxed and compressed positions and distributing forces applied thereto, when the handle portion is compressed.

A rod, in operative communication with the handle portion, is positioned so that it moves when the handle portion moves between the compressed and relaxed positions. There is at least one receiver, typically two, in communication with the frame, for receiving the rod, typically at its ends. The receivers include tracks in which the rod ends can move, in order that movement of the handle portion opens the vent. Along these tracks are channels, corresponding in shape to that of the rod, for engaging the rod in an engaged or locked position, when the handle portion is in the relaxed position. The handle portion is typically spring biased.

Another embodiment of the invention is directed to a vent apparatus having a moveable cover, that is configured for seating over at least a portion of an opening in a frame, and an engaging member movable between engaged and disengaged positions within a retaining structure. There is a handle in communication with the cover, this handle including a portion in communication with the engaging member. The handle portion is moveable between a relaxed position and a compressed position and configured for distributing compressive forces applied thereto, to the engaging member, for moving the engaging member from the engaged position to the disengaged position within the retaining structure. This allows for the cover to be moved.

The handle portion is typically spring biased, and the retaining structure typically includes oppositely disposed receivers, that receive the engaging member, typically a rod, a portion of which is seated in the handle. The receivers typically include tracks in which the rod ends can move, in order that movement of the handle portion opens the vent. Along these tracks are channels, corresponding in shape to that of the rod, for engaging the rod in an engaged or locked position, when the handle portion is in the relaxed position.

BRIEF DESCRIPTION OF THE DRAWINGS

Attention is now directed to the drawings, where like numerals and characters indicate like or corresponding components. In the drawings:

FIGS. 5A and 5B are cross sectional views of the ends of the grippable sheath of the apparatus, taken along line 5A—5A of FIGS. 3A and 5B—5B of FIG. 3A;

FIG. 6 is an alternate embodiment of a rod for the apparatus; and

DETAILED DESCRIPTION OF THE DRAWINGS

Figure 1:
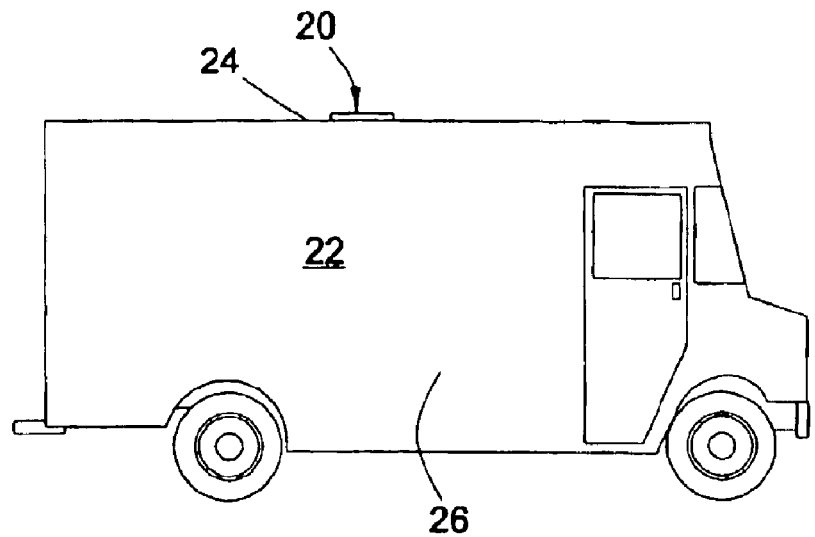
FIG. 1 is a side view of a vent apparatus in accordance with an embodiment of the invention, in use with a vehicle.

FIG. 1 shows the apparatus 20 of the present invention in an exemplary use as a vent or ventilator in a truck 22. The apparatus is typically positioned in a ceiling panel 24 over the cargo area 26. The apparatus 20 is typically at a height so as not to interfere with the cargo.

Throughout this document, references are made to directions including, above, below, upper, lower, upward, downward, outward, inward, etc. These directions are for explanation purposes only, to illustrate the apparatus 20 in exemplary orientations.

Turning also to FIGS. 2–4B, the apparatus 20, is formed of a body plate 30, having a rim 31 defining an open area 32, typically filled in with a screen 33. A moveable cover 34 rests over the open area 32 and seats on the rim 31. The moveable cover 34 is typically lined with a gasket 35 (FIG. 4A) (for example, of a rubber or polymeric material), so as to provide sealing from the ambient environment at the rim 31.

The moveable cover 34 attaches to a handle bracket 36, along flanges 37, at oppositely disposed support members 38. A base 39, that supports a grippable sheath 40, extends as a cross member between these support members 38. The support members 38 are symmetric with respect to each other and extend through slots 41 (FIGS. 3A and 4B) in the screen 33. These support members 36 also include openings 42 (only one shown), with edges 42a (upper) and 42b (lower).

Receivers 44 attach to the body plate 30 at opposite sides 46. These receivers 44 include inwardly indented tracks 47 running along their peripheries. The tracks 47 include channels 48 formed by grooves 48a, typically rounded, cut into the tracks 47 at predetermined positions. These positions typically correspond to the degree of openness of the cover 34. A rod 50 extends between the receivers 44 through openings 42 in the support members 38 and openings 52 in the grippable sheath 40. The rod 50 is of a length such that its ends 50e rest securely but movably in the tracks 47, and typically within the channels 48.

The body plate 30 and moveable cover 34 are such that the body plate 30 can be placed into an opening in the ceiling or roof of the vehicle 22 or vehicle space and attached thereto. The body plate 30 includes a peripheral lip 54, typically with openings 55 for accommodating screws, rivets or other fasteners, so as to be secured in a vehicle roof, with the body plate extending through a cut out opening in the vehicle roof. The cover 34 is attached to the flanges 37 of the support members 38 by typical materials fastening techniques, for example, welds, rivets, etc. The handle bracket 36 and the cover 34 are typically metal, plastic or the like.

The handle bracket 36 is typically a unitary member, with the grippable sheath 40 being a separate member. The sheath 40 includes columns 58, typically at the corners, for receiving springs 60. The openings 52 in the sheath 40, shown in FIGS. 5A and 5B, are just slightly larger than the outer diameter of the rod 50, and receive the rod 50 to confine its vertical movement, such that the rod 50 moves with the sheath 40. The springs 60 are of a characteristic that bias or push the rod 50 and sheath 40 in the direction of the cover 34 (typically upward), when the handle bracket 36 is in a rest position. The resultant biasing force compresses the gasket 35. Vertical movement of the rod 50 is limited by the edges 42a, 42b of the openings 42 of the support members 38, These openings 42 are larger than the outer diameter of the rod 50, allowing the rod 50 to move within these openings 42. The edges 42a, 42b of the openings 42 typically serve as stop surfaces for the rod 50.

Figure 3A:
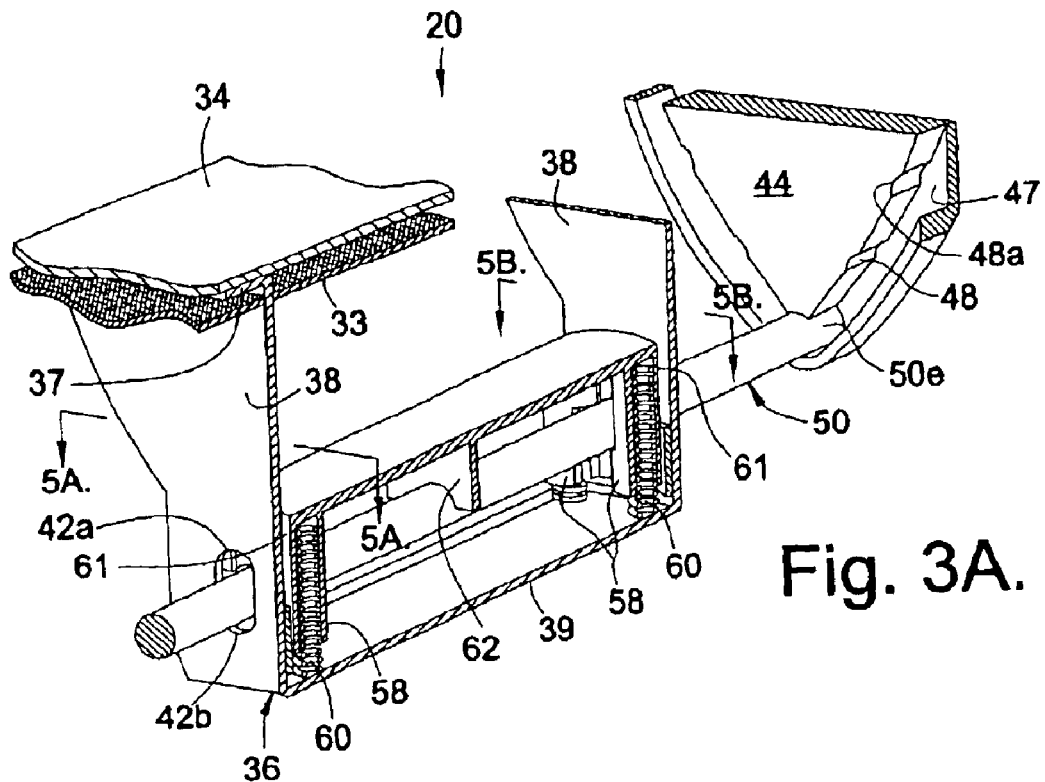
FIG. 3A is a perspective view of the vent apparatus of FIG. 1 (with the gasket removed) with the handle bracket in a relaxed position.
Figure 3B:
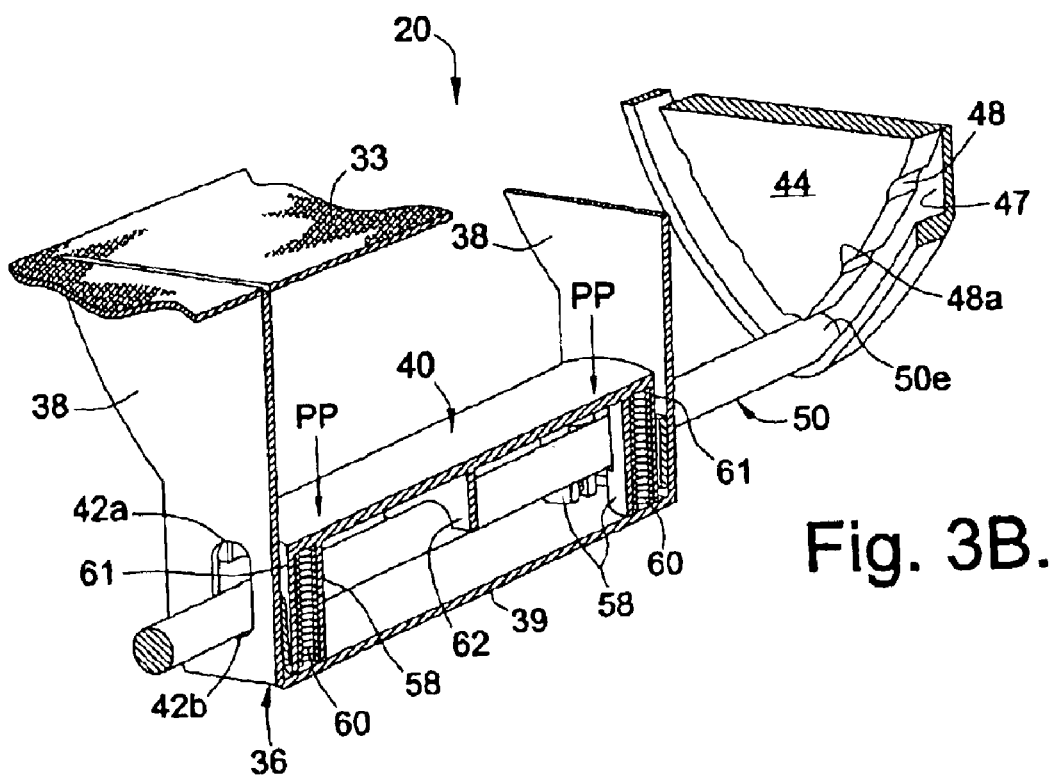
FIG. 3B is a perspective view of the vent apparatus of FIG. 1 with the handle bracket in a active position.
Figure 4A:
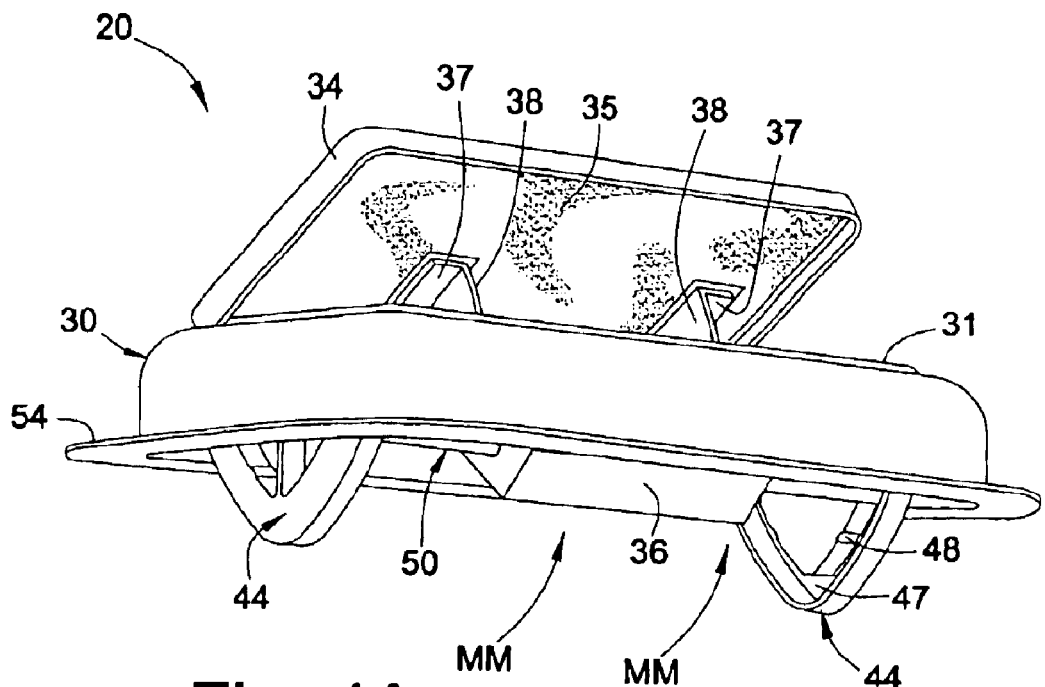
FIG. 4A is a perspective view of the apparatus with its cover in an open position.
Figure 4B:
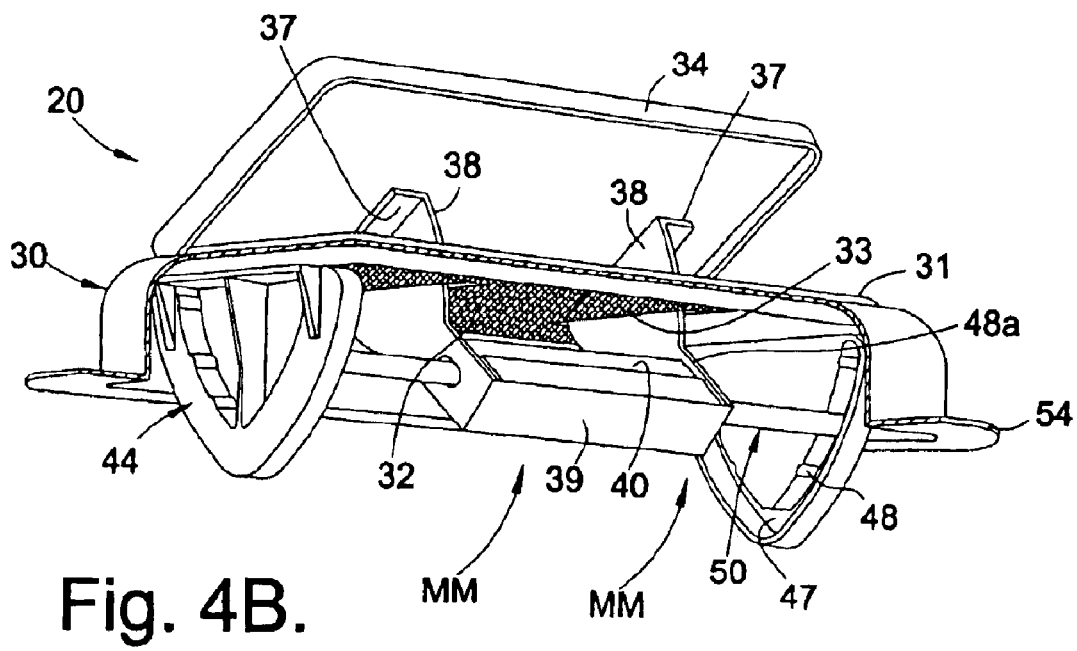
FIG. 4B is a cut-away perspective view of the vent apparatus (with its gasket removed) with its cover in an open position.

The sheath 40 is typically of a resilient material, for example, hard plastic, that allows it to be gripped and squeezed by a user (in the direction of arrows PP in FIG. 3B). The sheath 40 also includes at least one guide piece 62, typically positioned close to or in abutment with the rod 50. Alternately, as shown in FIG. 6, the rod 50 may also include a slot 66 (typically circumferential) that receives this guide piece 62. The positioning of the springs 60 is such that the sheath 40 can be gripped anywhere along its length and the force of gripping will move the rod 50 downward (in the direction of the arrow PP of FIG. 3B), allowing for movement of the handle bracket 36 and opening/closing of the cover 34 (for example, opening of the cover 34 can be in the direction of the arrows MM of FIGS. 4A and 4B).

Figure 2:
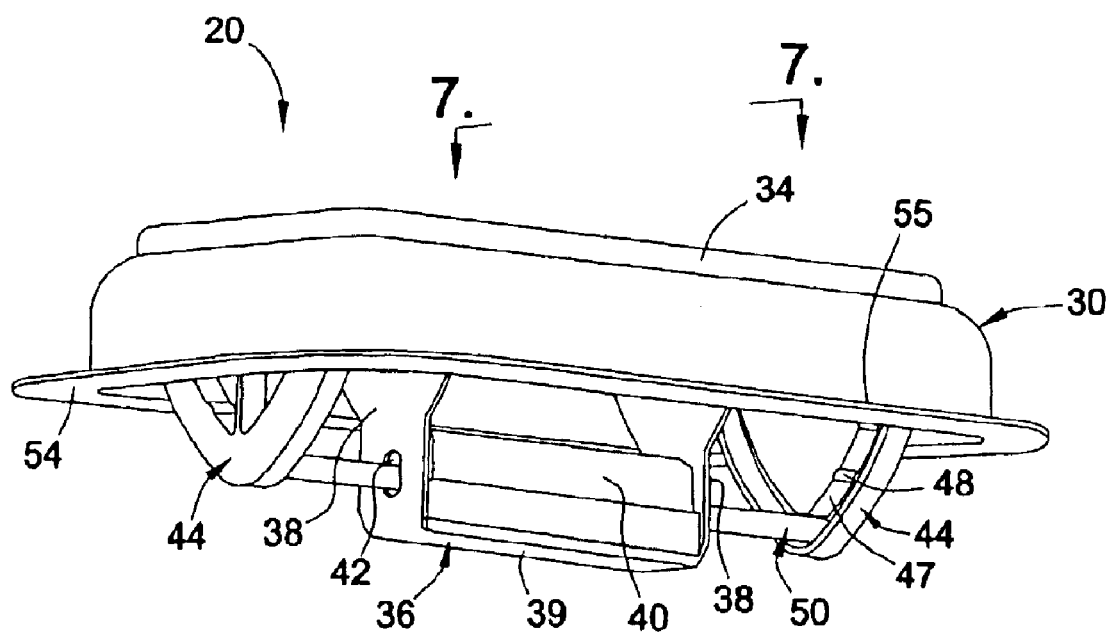
FIG. 2 is a perspective view of the vent apparatus of FIG. 1.
Figure 7A:
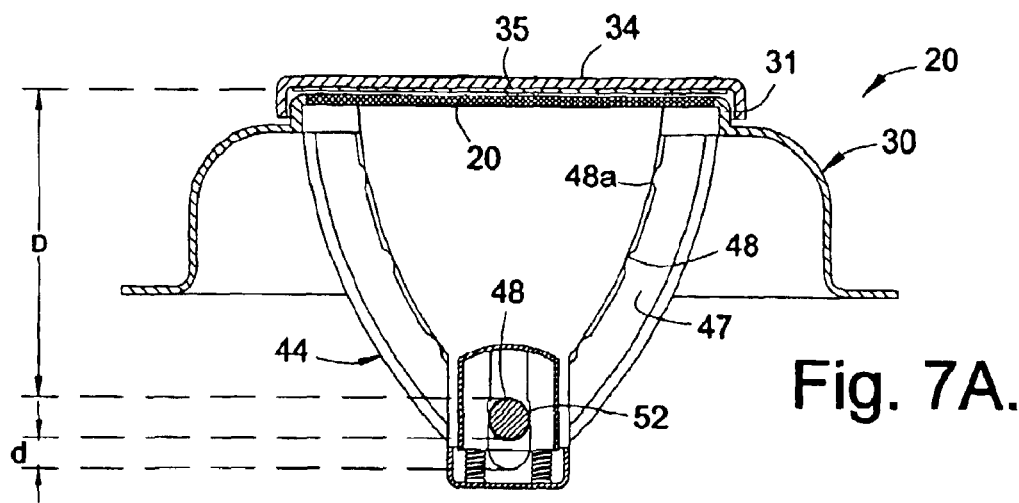
FIGS. 7A—7C are cross-sectional views of the vent apparatus taken along line 7—7 of FIG. 2 showing the apparatus in operation.

In an exemplary operation of the apparatus 20, reference is now made to FIGS. 2–5B and 7A–7C. Initially, as shown in FIGS. 2 and 7A, the apparatus 20 is in the closed position, where the cover 34 is closed over the rim 31 of the body plate 30. The sheath 40 is in a rest position as the springs 52 force the rod 50 upward (in the direction of the cover 34). Here, the ends 50e of the rod 50 are engaged in channels 48 of the respective tracks 47, with the gasket 35 compressed against the rim 31. At this position, the rod 50 is locked and can not be moved absent manual force. The tangent point of the rod 50 at the channel 48 is at a fixed distance D from the gasket 35. The opposite tangent point of the rod 50 is at a distance d from the lower edges 42b of the openings 42.

Figure 7B:
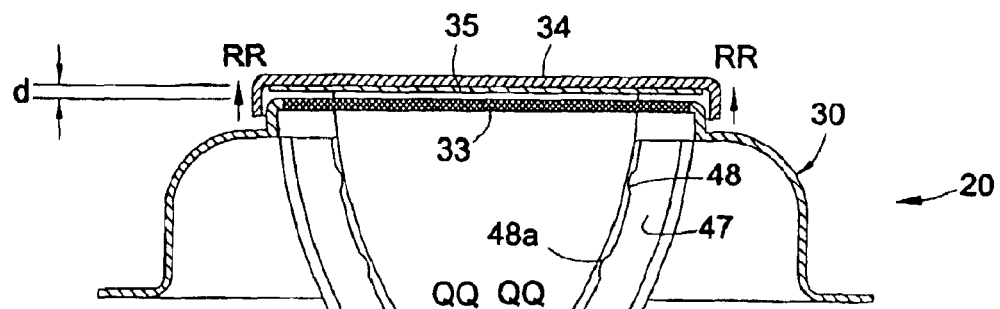

As shown in FIGS. 3B and 7B, when opening of the apparatus 20 is desired, movement of the cover 34 to a position where the open area 32 is open to the ambient environment, the sheath 40 is squeezed manually (typically downward, in the direction of arrows QQ), such that it moves downward. This manual force on the sheath 40 compresses the springs 60, and coupled with the upward movement of the handle portion 39, forces the cover 34 upward (in the direction of the arrows RR), a distance corresponding to the distance d. This upward movement of the cover 34 takes load off of the gasket 35. The movement of the rod 50, causes its ends 50e, to move out of the channels 48 and into the tracks 47. Downward (outward) movement of the rod 50 can continue until the rod 50 abuts the lower edges 42b of the respective openings 42 of the support members 38.

Figure 7C:
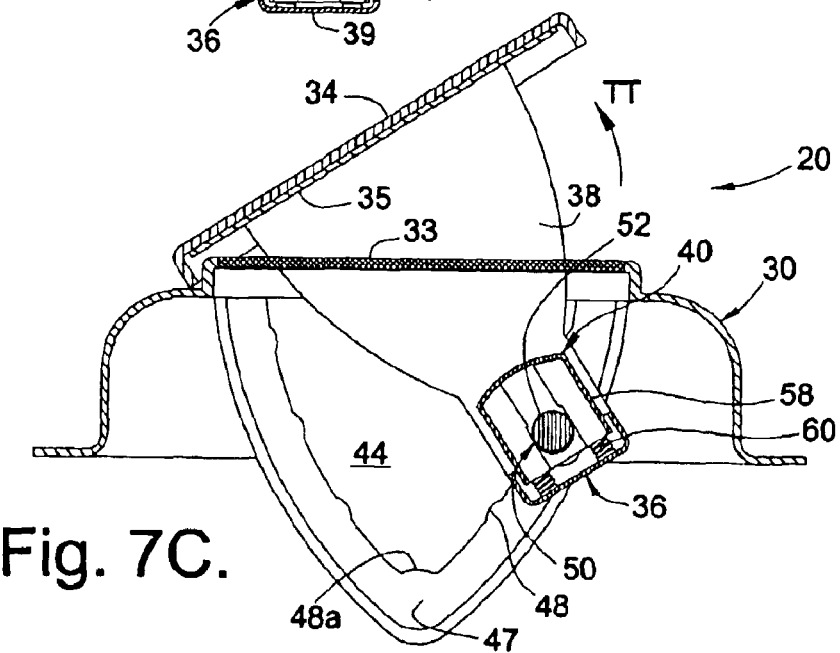

With the rod ends 50e in the tracks 48, continued gripping of the handle 40 coupled with its being moved in the upward direction (in the direction of the arrow TT), allows the rod ends 50e (also being moved upward or counterclockwise) to move within the tracks 47, as shown in FIG. 7C. When the desired channel 48 is neared or reached, this channel 48 corresponding to the desired degree of opening for the cover 34, pressure (the gripping pressure) on the sheath 40 can then be released, such that the springs 60 relax (expand).

The relaxing (extending) of the springs 60 will cause the rod ends 50e to move inward and seat in the channels 48, in a firm engagement, until the application of a new manual force. Should the gripping pressure be released near a channel 48, the continued movement of the handle bracket 36 toward the channel 48 will cause the rod ends 50e to snap into place in the channel 48 once it is reached.

This process is such that successive channels 48 can be skipped, as long as there is sufficient pressure on the grippable sheath 40 to keep it in the tracks 47 for movement therein to the desired channels 47. This process can be repeated as many times as desired to open and close the apparatus 20 as well as control the degree of openness for the cover 34.

There has been shown and described at least one preferred embodiment of a ventilation apparatus. It is apparent to those skilled in the art, however, that many changes, variations, modifications, and other uses and applications for the ventilation apparatus and its components are possible, and also such changes, variations, modifications, and other uses and applications which do not depart from the spirit and scope of the invention are deemed to be covered by the invention, which is limited only by the claims which follow.

What is claimed is:

1. A vent apparatus comprising:
   a frame;
   a cover movable with respect to said frame between closed and open positions;
   at least one support member in communication with said cover;
   a handle portion in communication with said at least one support member, said handle portion including a moveable portion configured for moving between relaxed and compressed positions and a base portion for supporting said moveable portion;

a rod in operative communication with said moveable portion of said handle portion, so as to move when said moveable portion moves between said compressed and said relaxed positions; and at least one receiver in communication with said frame, said at least one receiver for receiving said rod.

2. The apparatus of claim 1, wherein said frame includes an opening therein.

3. The apparatus of claim 2, wherein said cover extends over said opening in said frame when in said closed position.

4. The apparatus of claim 1, wherein said moveable portion of said handle portion includes:

a plurality of spring members; and a sheath in operative communication with said plurality of spring members for distributing compressive forces to said spring members.

5. The apparatus of claim 4, wherein said spring members include a spring and a column, said column at least partially enveloping said spring.

6. The apparatus of claim 5, wherein said column includes a portion configured for contacting said rod when said spring members are compressed.

7. The apparatus of claim 4, wherein said handle portion additionally includes, a member intermediate said sheath and said rod, for applying force to said rod when said spring members are compressed.

8. The apparatus of claim 4, wherein said sheath is of a resilient material.

9. The apparatus of claim 4, wherein said plurality of spring members includes four spring members.

10. The apparatus of claim 1, wherein said at least one support member includes two support members, said support members oppositely disposed with respect to said base portion of said handle portion.

11. The apparatus of claim 2, wherein said at least one receiver includes two receivers, said receivers oppositely disposed with respect to each other for receiving the ends of said rod.

12. The apparatus of claim 11, wherein each of said receivers includes a track for allowing said rod to move therein.

13. The apparatus of claim 12, wherein said track includes at least one channel for engaging said rod when said spring members are in relaxed positions.

14. The apparatus of claim 1, wherein said moveable portion of said handle portion is spring biased.

15. A vent apparatus comprising:

a moveable cover, said cover configured for seating over at least a portion of an opening in a frame;

an engaging member movable between engaged and disengaged positions within a retaining structure; and a handle in communication with said cover, said handle including a moveable portion in communication with said engaging member, said moveable portion moveable between a relaxed position and a compressed position, and said moveable portion is configured for distributing compressive forces applied at any location alone said moveable portion to said engaging member, such that said engaging member is moved from said engaged position to said disengaged position within said retaining structure, allowing for said cover to be moved.

16. The apparatus of claim 15, additionally comprising: a frame, said frame including an opening.

17. The apparatus of claim 16, wherein said engaging member includes a rod.

18. The apparatus of claim 17, wherein said retaining structure includes oppositely disposed retainers configured for movably retaining said rod.

19. The apparatus of claim 18, wherein said retainers are attached to said frame.

20. The apparatus of claim 18, wherein said retainers include tracks allowing said rod to move therein.

21. The apparatus of claim 20, wherein said each of said tracks includes at least one channel for engaging said rod when said moveable portion is in said relaxed position.

22. The apparatus of claim 15, wherein said moveable portion is spring biased.

23. The apparatus of claim 17, wherein said handle includes a bracket portion, said bracket portion in communication with said cover and configured for receiving said moveable portion, said bracket portion including openings, disposed on opposite sides of said moveable portion, through which said rod extends.

24. The apparatus of claim 23, wherein said moveable portion includes openings disposed at opposite ends of said moveable portion for said rod to extend therethrough, and said openings in said moveable portion for confining said rod.

25. The apparatus of claim 10, wherein said support members each include an opening through which said rod extends.

26. The apparatus of claim 4, wherein said sheath includes openings disposed at opposite ends thereof for said rod to extend therethrough, said openings in said sheath for confining said rod.

27. A vent apparatus comprising:

a frame;

a cover movable with respect to said frame between closed and open positions;

a bracket defining at least a portion of a handle, said bracket in communication with said cover, said bracket including a base portion;

a moveable member for moving between first and second positions, said moveable member defining at least a portion of said handle and supported by said base portion of said bracket;

a rod in operative communication with said moveable member, so as to move when said moveable member moves between said first position and said second position; and at least one receiver in communication with said frame, said at least one receiver for receiving said rod.

28. The apparatus of claim 27, wherein said moveable member supported by said base portion is configured such that at least a portion of said moveable member is received in said base portion.

29. The apparatus of claim 27, wherein said frame includes an opening therein.

30. The apparatus of claim 29, wherein said cover extends over said opening in said frame when in said closed position.

31. The apparatus of claim 27, wherein said moveable member includes:

a plurality of spring members; and a sheath in operative communication with said plurality of spring members for distributing compressive forces to said spring members.

32. The apparatus of claim 31, wherein said sheath includes openings at oppositely disposed ends thereof, through which said rod extends, said openings in said sheath for confining said rod.

33. The apparatus of claim 31, wherein said spring members include a spring and a column, said column at least partially enveloping said spring.

34. The apparatus of claim 33, wherein said column includes a portion configured for contacting said rod when said spring members are compressed.

35. The apparatus of claim 31, additionally comprising, a guide member intermediate said sheath and said rod, for applying force to said rod when said spring members are compressed.

36. The apparatus of claim 31, wherein said sheath is of a resilient material.

37. The apparatus of claim 31, wherein said plurality of spring members includes four spring members.

38. The apparatus of claim 27, wherein said at bracket includes two support members, each of said support members oppositely disposed with respect to said base portion.

39. The apparatus of claim 38, wherein said support members each include an opening through which said rod extends.

40. The apparatus of claim 27, wherein said at least one receiver includes two receivers, said receivers oppositely disposed with respect to each other for receiving the ends of said rod.

41. The apparatus of claim 40, wherein each of said receivers includes a track for allowing said rod to move therein.

42. The apparatus of claim 41, wherein said track includes at least one channel for engaging said rod when said spring members are in relaxed positions.

43. The apparatus of claim 27, wherein said moveable member is spring biased.

* * * * *